United States Patent
Majumdar et al.

(10) Patent No.: US 10,619,748 B1
(45) Date of Patent: Apr. 14, 2020

(54) PHASE DIVERSITY SYSTEM AND METHOD FOR PRODUCING A CORRECTED IMAGE AND/OR FOR AIMING ELECTROMAGNETIC ENERGY

(75) Inventors: Arun Kumar Majumdar, Ridgecrest, CA (US); David Alan O'Connor, Ridgecrest, CA (US); Phillip Philemon Land, Ridgecrest, CA (US); John Paul Siegenthaler, Ridgecrest, CA (US); Charles Denton Marrs, Ridgecrest, CA (US); Joni Marie Pentony, Ridgecrest, CA (US); Lewis DeSandre, London (GB)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 2638 days.

(21) Appl. No.: 12/924,795

(22) Filed: Sep. 30, 2010

(51) Int. Cl.
*G02F 1/29* (2006.01)
*F16K 11/20* (2006.01)

(52) U.S. Cl.
CPC .............. *F16K 11/20* (2013.01); *G02F 1/292* (2013.01); *G02F 2203/18* (2013.01)

(58) Field of Classification Search
CPC ............................ G02F 2203/01; G02F 1/292
See application file for complete search history.

(56) References Cited

U.S. PATENT DOCUMENTS

| | | | |
|---|---|---|---|
| 4,309,602 A | 1/1982 | Gonsalves et al. | |
| 5,610,707 A * | 3/1997 | Duncan | G01J 9/00 250/201.9 |
| 6,809,307 B2 | 10/2004 | Byren et al. | |
| 7,041,953 B2 | 5/2006 | Byren | |
| 7,274,442 B2 | 10/2007 | Dolne et al. | |
| 7,403,336 B2 | 7/2008 | Golberg et al. | |
| 7,554,672 B2 | 6/2009 | Greenway | |
| 2006/0022115 A1 * | 2/2006 | Byren | 250/201.9 |
| 2006/0175528 A1 * | 8/2006 | Greenaway | G01J 9/00 250/201.9 |
| 2007/0003155 A1 * | 1/2007 | Miller et al. | 382/254 |
| 2011/0121158 A1 * | 5/2011 | Corke | G02B 5/10 250/201.9 |
| 2011/0164783 A1 * | 7/2011 | Hays et al. | 382/100 |

* cited by examiner

*Primary Examiner* — Eric L Bolda
(74) *Attorney, Agent, or Firm* — Naval Air Warfare Center Weapons Division; Christopher L. Blackburn; James M. Saunders

(57) ABSTRACT

A phase diversity system and method for producing a corrected image and/or for aiming electromagnetic energy.

18 Claims, 3 Drawing Sheets

US 10,619,748 B1

PHASE DIVERSITY SYSTEM AND METHOD FOR PRODUCING A CORRECTED IMAGE AND/OR FOR AIMING ELECTROMAGNETIC ENERGY

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a phase-diversity system and method.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claim.

DETAILED DESCRIPTION

Figure 1:
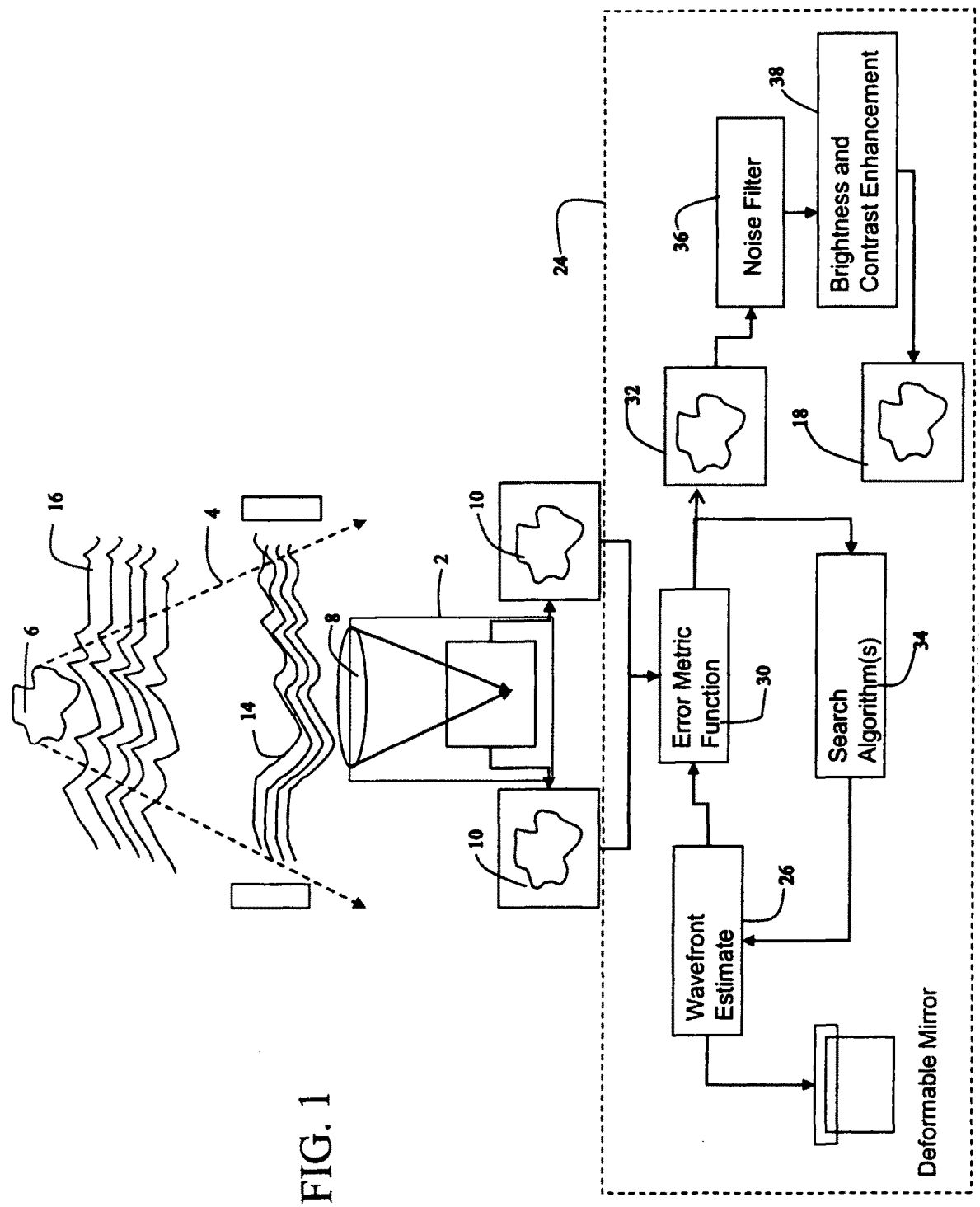
FIG. 1 illustrates a perspective flew and block diagram of an embodiment of a system for producing a corrected image.
Figure 2:
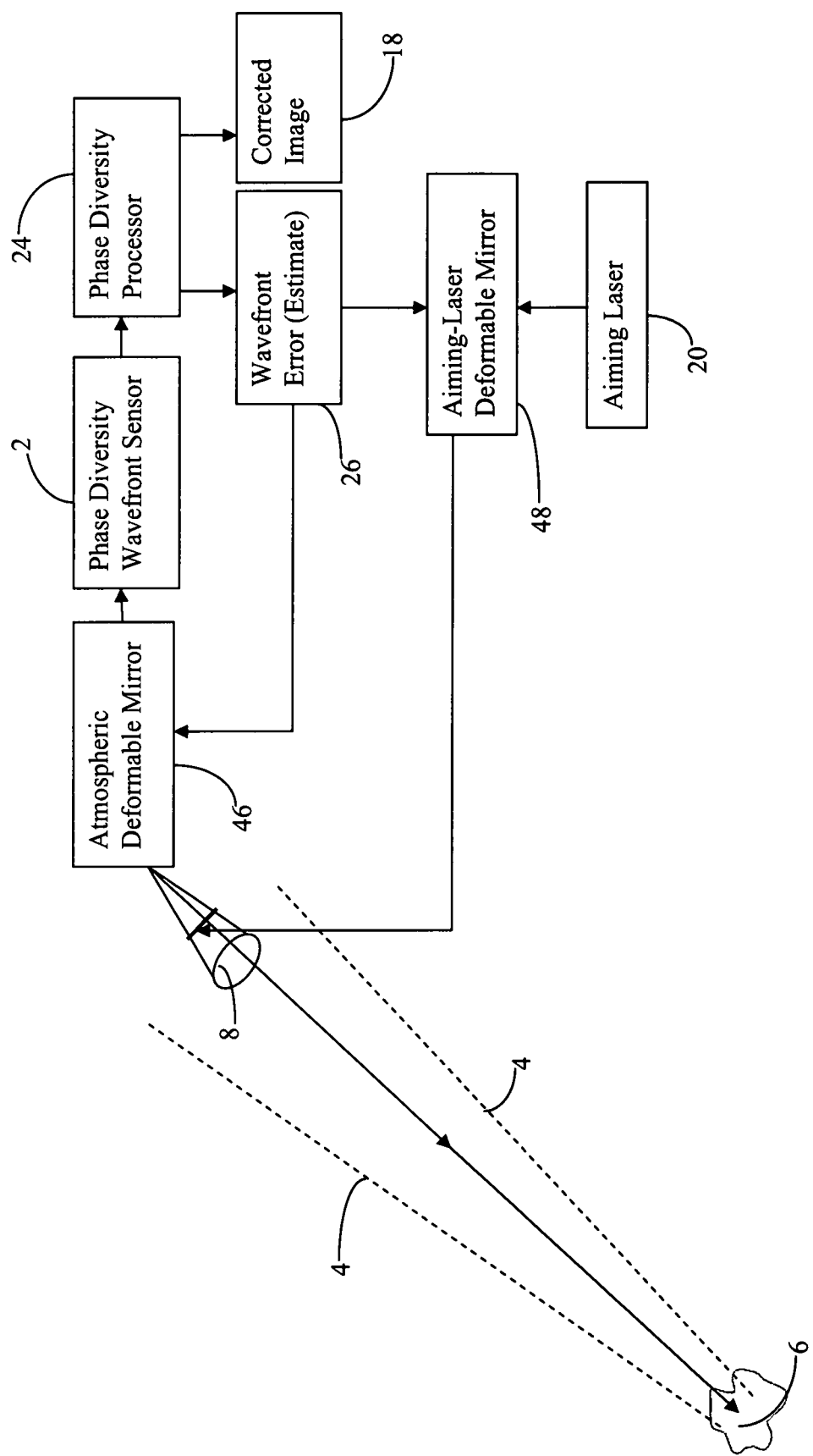
FIG. 2 illustrates a perspective view and block diagram of an embodiment of a system for producing a corrected image and aiming electromagnetic energy (in the illustrated embodiment a laser).
Figure 3:
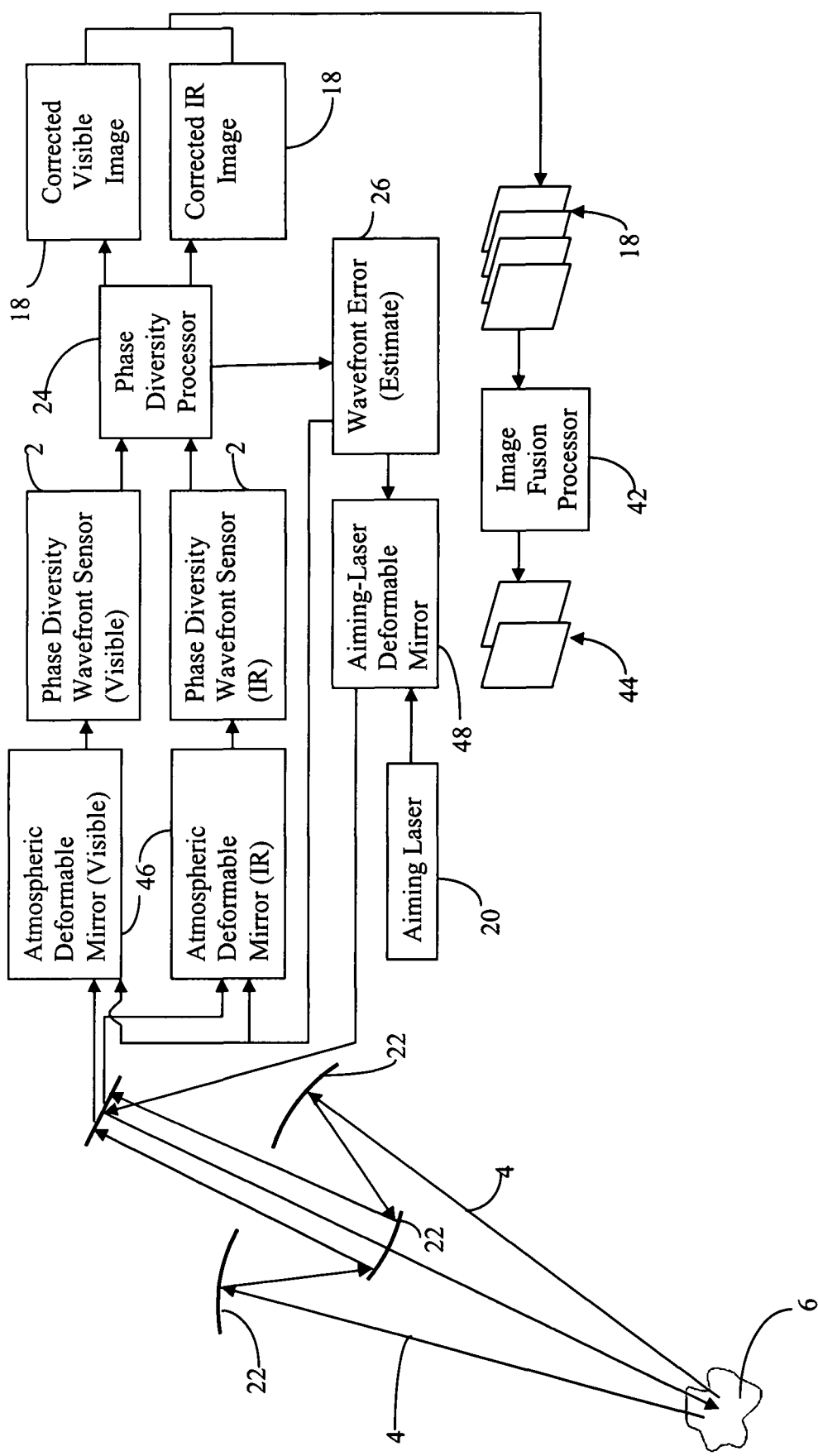
FIG. 3 illustrates a perspective view and block diagram of an embodiment of a system for producing a corrected image, performing image fusion, and aiming electromagnetic energy (in this embodiment a laser).

With reference to FIGS. 1-3, embodiments of the invention include at least one phase diversity wavefront sensor 2 (shown as a dashed box in FIG. 1). Radiant energy 4 originating from an extended object 6 at a remote location is focused by a telescope aperture (8 in FIGS. 1, 2) upon the at least one phase diversity wavefront sensor 2. The phase diversity wavefront sensor 2 includes two, two-dimensional arrays of sensors of electromagnetic energy, or cameras, which generate images (10 in FIG. 1) of the object in two known positions. In some embodiments, the phase diversity wavefront sensor 2 generated images (10 in FIG. 1) include at least one in focus image that is distorted by uncorrected aberrations in the medium (sources of aberrations in the medium include atmospheric turbulence 16 in FIG. 1 and aero-optic turbulence 14 in FIG. 1) between the phase diversity wavefront sensor 2 and the object 6 and at least one out of focus image; however, the phase diversity wavefront sensor 2 generated images (10 in FIG. 1) may both be out of focus, as long as the relative difference in focus between the two images (10 in FIG. 1) is known. The phase diversity waverfront sensor 2 generated images (10 in FIG. 1) are used in estimating the distortions affecting the uncorrected image and in generating a corrected image 18. Atmospheric turbulence (16 in FIG. 1) along the path will produce distortions in the wavefront and phase diversity waverfront sensor 2 generated image (10 in FIG. 1). Depending on conditions, there may be additional aero-optic effects (14 in FIG. 1), associated with the airflow around the casing of the phase diversity wavefront sensor 2 and the structure or vehicle the phase diversity wavefront sensor 2 is mounted on.

In some embodiments, the phase diversity wavefront sensor 2 includes a plurality of cameras. In some embodiments, the cameras are mounted on a precision micrometer linear stage and are located at equal distances from the focused image plane. Phase diversity wavefront sensor 2 generated images (10 in FIG. 1) are recorded by the two cameras. This allows the recovery of phase information from two data sets recorded under different focus conditions.

The naturally occurring radiant energy 4 may come from direct, indirect, reflected, and/or scattered (by aerosols or other particulates) illumination. Sunlight can be used to obtain an image (10 in FIG. 1) in the phase-diversity wavefront sensor 2. When daylight is not available, the extended object's 6 own radiation can be observed and imaged at other wavelength band, for example, in the midwave infrared. The system and method described in this invention can be utilized to generate a corrected image 18 and/or aim a electromagnetic energy 20 at day or night times.

With reference to FIG. 3, in some embodiments, a reflective telescope mirror 22 is used to collect the radiation energy 4 from the extended object 6 and imaged simultaneously by both phase diversity wavefront sensors 2. One of the phase diversity wavefront sensors 2 operates in the visible region containing phase-diversity visible CCD cameras and the other phase diversity wavefront sensor 2 contains phase diversity cameras operating in the midwave infrared (MWIR) region of the broadband. Note that this method is wavelength-independent and hence PD cameras for any other wavelengths will also be applicable to obtain broadband corrected image. For the sake of example, visible and MWIR are used. The blurred (uncorrected) images at visible and NWIR wavelengths are collected and processed by the PD processor 24.

The phase diversity wavefront sensor 2 is electronically associated with a phase diversity processor 24. The term "phase diversity processor" as used in this patent application describes any electronic component or set of components capable of being adapted to (including programmed to) produce a corrected image 18 as described herein. The phase diversity processor 24 is programmed to iteratively solve inverse problems of point-spread functions associated with observed aberrations to produce a corrected image 18 and an estimate of wavefront distortions associated with a phase diversity wavefront sensor 2 generated image (10 in FIG. 1) for each of the phase diversity wavefront sensors 2. The phase diversity processor 24 is adapted to (or programmed to) perform phase diversity image reconstruction as outlined by Gonsalves and Childlaw in 1979 and further expanded upon by Gonsalves in 1982 and Paxman et. al. in 1992. In arriving at a final solution, i.e., the wavefront estimate that the PD processor 24 settles upon as the best match for the images provided, the phase diversity processor 24 generates a reconstruction of the phase aberrations that resulted in aberrations in the images generated by the PD wavefront sensor 2, i.e., the PD processor reconstructs wavefront errors 26. The PD Processor 24 is programmed to iteratively solve inverse problems of point-spread functions, (by iterating through a reconstruction loop), associated with observed aberrations to produce a corrected image 18 and a wavefront errors 26, i.e. estimate of wavefront distortions associated with an uncorrected image (10 in FIG. 1) for each of the at least one PD wavefront sensor 2. The Phase Diversity Processor 24 iterates through the reconstruction loop (identified as the dashed box with reference number 28 in FIG. 1) and solves an error metric function (30 in FIG. 1) using the PD wavefront sensor 2 generated images (10 in FIG. 1) and the wavefront estimate 26 generated during the previous iteration, until it is run a pre-determined amount of times and/or the change in error metric function 30 is below a pre-determined value. The image reconstructed using the final iteration's wavefront estimate 26 is deemed to be a 'reconstructed image' (32 in FIG. 1).

A flow chart of an embodiment of an image reconstruction process is shown in FIG. 1. The phase diversity processor 28 performs phase diversity image reconstruction using an error metric function 30 to indicate the quality of reconstruction produced by a given wavefront estimate 26. Using one optical pathway for all phase diversity wavefront sensors 2, with the same wavefront aberration being seen by multiple cameras operating at different wavelengths, a single wavefront estimate 26, expressed in terms of distance, is used to generate aberrating point spread functions seen in each image as described by Gonsalves et. al. Modifying the Gonsalves notation so that $I_{nm}$ corresponds to the $m^{th}$ image associated with the $n^{th}$ camera or set of cameras, the expanded merit function used to evaluate potential solutions would then be $$E = \sum \left\{ \begin{array}{l} \alpha_1[|I_{11} - I_0 S_{11}|^2 + |I_{12} - I_0 S_{12}|^2] + \\ \alpha_2[|I_{21} - I_0 S_{21}|^2 + |I_{22} - I_0 S_{22}|^2] + \ldots + \\ \alpha_k[|I_{k1} - I_0 S_{k1}|^2 + |I_{k2} - I_0 S_{k2}|^2] \end{array} \right\}$$

where the coefficients of $\alpha_k$ being weighting functions for the different sensor wavelengths. This method would use a monochrome estimate for the true image of $$I_0 \frac{\alpha_1[I_{11}S_{11}^* + I_{12}S_{12}^*] + \alpha_2[I_{21}S_{21}^* + I_{22}S_{22}^*] + \ldots + \alpha_k[I_{k1}S_{k1}^* + I_{k2}S_{k2}^*]}{\alpha_1[|S_{11}|^2 + |S_{12}|^2] + \alpha_2[|S_{22}|^2 + |S_{22}|^2] + \ldots + \alpha_k[|S_{k1}|^2 + |S_{k2}|^2]}$$

Alternatively, if the object being viewed is expected to have a significantly different appearance under different wavelengths, then separate image estimates of the form $$I_{0k} = \frac{[I_{k1}S_{k1}^* + I_{k2}S_{k2}^*]}{[|S_{k1}|^2 + |S_{k2}|^2]}$$

may be used with each set of images associated with a given wavelength.

A search algorithm 34, such as, for example, a gradient-based minimization and/or a neighborhood search, is used within the reconstruction loop. A neighborhood search, also called a global search, tries a number of widely-scattered possibilities to find a good-scoring/low-lying region of the search space of possible values. The gradient-based minimization is a localized search that makes small adjustments to the current guess to determine which direction in the search space would be considered "downhill", leading to lower/better scores for the error metric. However, in some embodiments, a two-stage method of finding a solution is implemented. Gradient-based search methods are susceptible to remaining in local minima, while other methods are better at finding a global "neighborhood" that can then be refined with a gradient method.

Once a reconstructed image 32 is generated by the phase-diversity processor 28, in some embodiments, edge windowing and/or selective frequency filtering 36 are used to reduce noise in the reconstructed image 32, while adjustments to background brightness and image contrast 38 are used to enhance visibility of details in the reconstructed image 32; in these embodiments, the resulting image is the 'corrected image' 18. In other embodiments, neither edge windowing nor selective frequency filtering 36 is used; in these embodiments, the reconstructed image 36 is the 'corrected image' 18. Real-time sharpening and compensation is possible with parallel processing utilizing computer hardware such as field programmable gate arrays (FPGAs) and graphical processing units (GPUs).

With reference to FIG. 3, in some embodiments, an electronic processor 42 is used to perform image fusion to combine reconstructed images 18 associated with separate phase diversity wavefront sensors 2 operating in different wavelengths (such as visible and mid-wave IR) to obtain at least one composite image 44 with extended information content. Image fusion may also be used to combine multiple images from a given sensor to form a composite image in which information of interest is enhanced. Any form of image fusion technique may be used; this invention is independent of any specific technique of image function. In one embodiment, image fusion is to perform image combination, for example, in a pyramid transform. An image pyramid is first constructed for each phase diversity wavefront sensor 2 image, then a pyramid is formed for the composite image 44 by selecting coefficients from the source image pyramids and finally, the composite image 44 is recovered through an inverse pyramid transform. The research is described in the reference.

With reference to FIGS. 2 and 3, in some embodiments, adaptive optics components 46, 48 are electromechanically controlled using wavefront error information (including the final reconstruction loop's wavefront estimate) 26 generated by the phase diversity processor 24. The adaptive optics components 46, 48 are adapted to apply a conjugate distortion to a wavefront of an incoming or outgoing beam using the wavefront estimate 26, (calculated during the reconstruction loop by the phase diversity processor), to mitigate distortion effects of intervening media. Where the adaptive optics components are used to aim electromagnetic energy 20, the electromagnetic energy 20 can be of any wavelength, either a low power or an HEL. In some embodiments, the adaptive optics components 46, 48 include a deformable mirror(s). FIGS. 2 and 3 illustrates the scheme where the atmospheric aberration information that is obtained from the reconstruction algorithm also has wavefront error information. Where the adaptive optics components 46, 48 are used to aim electromagnetic energy 20, the aberrations control a deformable mirror which is referred to herein as an 'aiming-laser deformable mirror' 48. Corrections for aberrations in the wavefront of the object 6 return are used to conjugate the outgoing electromagnetic energy so that the electromagnetic energy is aimed and focused on the object 6. This method can provide adaptive optics control for simultaneous inspection and surgery of the eye. PD can sharpen retinal images and compensate for movement. Also, the wavefront information can enable a deformable mirror 46, 48 to focus electromagnetic energy on the retinal surface. These benefits address aberrations that are of higher order than the conventional power and astigmatism (cylinder).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A phase-diversity system, comprising:
   at least one phase diversity wavefront sensor;
   at least one phase diversity processor programmed to process information from said at least one phase diversity wavefront sensor to produce at least one corrected image; and
   adaptive optics components electromechanically controlled using wavefront error information extracted from said at least one phase diversity processor, said adaptive optics components adapted to apply a conjugate distortion to a wavefront of incoming and/or outgoing electromagnetic energy to mitigate distortion effects of intervening media;
   wherein the number of said at least one corrected image is at least two, wherein said at least one phase diversity wavefront sensor includes a first phase diversity wavefront sensor and a second phase diversity wavefront sensor, wherein said first wavefront sensor includes a first plurality of cameras and said second wavefront sensor includes a second plurality of cameras.

2. The system of claim 1 wherein said adaptive optics components comprises a deformable mirror.

3. The system of claim 1 wherein said at least one phase diversity processor is programmed to iteratively solve inverse problems of point-spread functions associated with observed aberrations to produce a corrected image and an estimate of wavefront distortions associated with an uncorrected image for each of said at least one phase diversity sensor.

4. The system of claim 1 wherein said incoming and/or outgoing electromagnetic energy is any form of electromagnetic radiation distorted by intervening medium.

5. The system of claim 4 wherein said outgoing electromagnetic energy is selected from the group consisting of HEL (High Energy Laser), an optical communications beam, and precision beam for medical or industrial applications.

6. The system of claim 1 further comprising: an electronic processor adapted to perform image fusion using at least two of said at least two corrected images.

7. A method of aiming an outgoing beam, comprising:
   using at least one phase diversity wavefront sensor and at least one phase diversity processor associated with said at least one phase diversity wavefront sensor to produce at least one corrected image and at least one wavefront, estimate of wavefront distortions associated with an uncorrected image; and
   using said at least one wavefront estimate to apply a conjugate distortion to a wavefront of an outgoing beam using adaptive optic components;
   wherein the number of said at least one corrected image is at least two, wherein said at least one phase diversity wavefront sensor includes a first phase diversity wavefront sensor and a second phase diversity wavefront sensor, wherein said first wavefront sensor includes a first plurality of cameras and said second wavefront sensor includes a second plurality of cameras.

8. The method of claim 7 wherein said using a phase diversity wavefront sensor and associated wavefront processor to produce a corrected image and at least one estimate of wavefront distortions associated with an uncorrected image step comprises iteratively solving inverse problems of point-spread functions associated with observed aberrations.

9. The method of claim 8 wherein said using a phase diversity wavefront sensor and associated wavefront processor to produce a corrected image and at least one wavefront estimate of wavefront distortions associated with an uncorrected image step comprises reconstructing wavefront errors.

10. The method of claim 9 further comprising using an adaptive optical element to provide corrections to incoming and/or outgoing electromagnetic energy to mitigate distortion effects of intervening media.

11. The method of claim 7 further comprising providing an electronic processor adapted to perform image fusion using said at least two corrected images.

12. The method of claim 7 further comprising providing instructions to cause an electronic processor to perform image fusion using at least two of said at least two corrected images.

13. The method of claim 12 further comprising providing instructions to cause an electronic processor to perform an image pyramid transform using at least two of said plurality of corrected images, wherein performing image fusion using said image pyramid transform comprises:
   constructing an image pyramid for each of said plurality of corrected images;
   forming an image pyramid for a composite image by selecting coefficients from said plurality of corrected images; and
   recovering a composite image through an inverse pyramid transform.

14. A system for generating a corrected image, comprising:
   a plurality of phase diversity sensors;
   at least one phase diversity processor programmed to process information from said plurality of phase diversity sensors to produce a plurality of corrected images; and
   at least one electronic processor adapted to perform image fusion using at least two of said plurality of corrected images.

15. The system of claim 14 wherein said plurality of phase diversity sensors comprises a visible wavelength camera and a mid-wave infrared camera.

16. The system of claim 15 wherein said electronic processor is adapted to perform image fusion using at least two of said plurality of corrected images and an image pyramid transform, wherein performing image fusion using said image pyramid transform comprises:
   constructing an image pyramid for each of said plurality of corrected images;
   forming an image pyramid for a composite image by selecting coefficients from said plurality of corrected images; and
   recovering a composite image through an inverse pyramid transform.

17. A method of generating a corrected image, comprising:
   providing a plurality of phase diversity wavefront sensors and at least one phase diversity processor associated with said plurality of phase diversity wavefront sensors;
   using said plurality of phase diversity wavefront sensors and said at least one phase diversity processor associated with said at least one phase diversity wavefront sensor to produce at least one corrected image and at least one wavefront estimate of wavefront distortions associated with an uncorrected image; and providing instructions for causing an electronic processor to perform image fusion using at least two of said plurality of corrected images.

18. The method of generating a corrected image of claim 17 wherein said providing instructions to cause an electronic processor to perform image fusion using at least two of said plurality of corrected images step comprises providing instructions to cause an electronic processor to perform an image pyramid transform using at least two of said plurality of corrected images, wherein performing an image pyramid transform comprises:

constructing an image pyramid for each of said plurality of corrected images;

forming an image pyramid for a composite image by selecting coefficients from said plurality of corrected images; and recovering a composite image through an inverse pyramid transform.

\* \* \* \* \*